United States Patent [19]

Hughes et al.

[11] Patent Number: 4,592,575
[45] Date of Patent: Jun. 3, 1986

[54] HOSE AND CLAMP CAP

[75] Inventors: Brett A. Hughes, Van Wert; David L. Gilbert, Paulding, both of Ohio

[73] Assignee: Aeroquip Corporation, Jackson, Mich.

[21] Appl. No.: 624,958

[22] Filed: Jun. 27, 1984

[51] Int. Cl.⁴ .............................................. F16L 33/08
[52] U.S. Cl. ...................... 285/252; 285/253; 285/259; 285/402; 24/274 R; D23/44; D8/356
[58] Field of Search ................. 285/252, 253, 37, 256, 285/257, 259, 400, 402; 24/274 R, 274 P, 274 WB; D23/44; D8/356

[56] References Cited

U.S. PATENT DOCUMENTS

| | | | |
|---|---|---|---|
| D. 251,676 | 4/1979 | Fouts | D23/44 |
| D. 251,918 | 5/1979 | Fouts | D23/44 |
| 1,101,844 | 6/1914 | Gething | 285/253 |
| 2,102,010 | 12/1937 | Kopp | 285/253 |
| 2,117,955 | 5/1938 | Haas | 285/322 |
| 2,320,367 | 6/1943 | Leathers | 285/256 |
| 2,374,226 | 4/1945 | Melsom | 285/256 |
| 2,850,302 | 9/1958 | Billingsley | 285/259 |
| 3,954,290 | 5/1976 | Corbin | 285/322 |
| 4,135,744 | 1/1979 | Fouts | 285/253 |

FOREIGN PATENT DOCUMENTS

| | | | |
|---|---|---|---|
| 2907813 | 9/1980 | Fed. Rep. of Germany | 285/256 |
| 1249862 | 10/1971 | United Kingdom | 285/256 |

*Primary Examiner*—Cornelius J. Husar
*Assistant Examiner*—Eric K. Nicholson
*Attorney, Agent, or Firm*—Beaman & Beaman

[57] ABSTRACT

The invention pertains to a protective and decorative cap for the ends of hose lines, particularly for use with a worm gear type hose clamp. The cap includes a slot wherein the clamp enters the cap by axial displacement on the hose, and internally, the cap includes an annular hose cover retaining shoulder confining the hose cover against unraveling.

1 Claim, 6 Drawing Figures

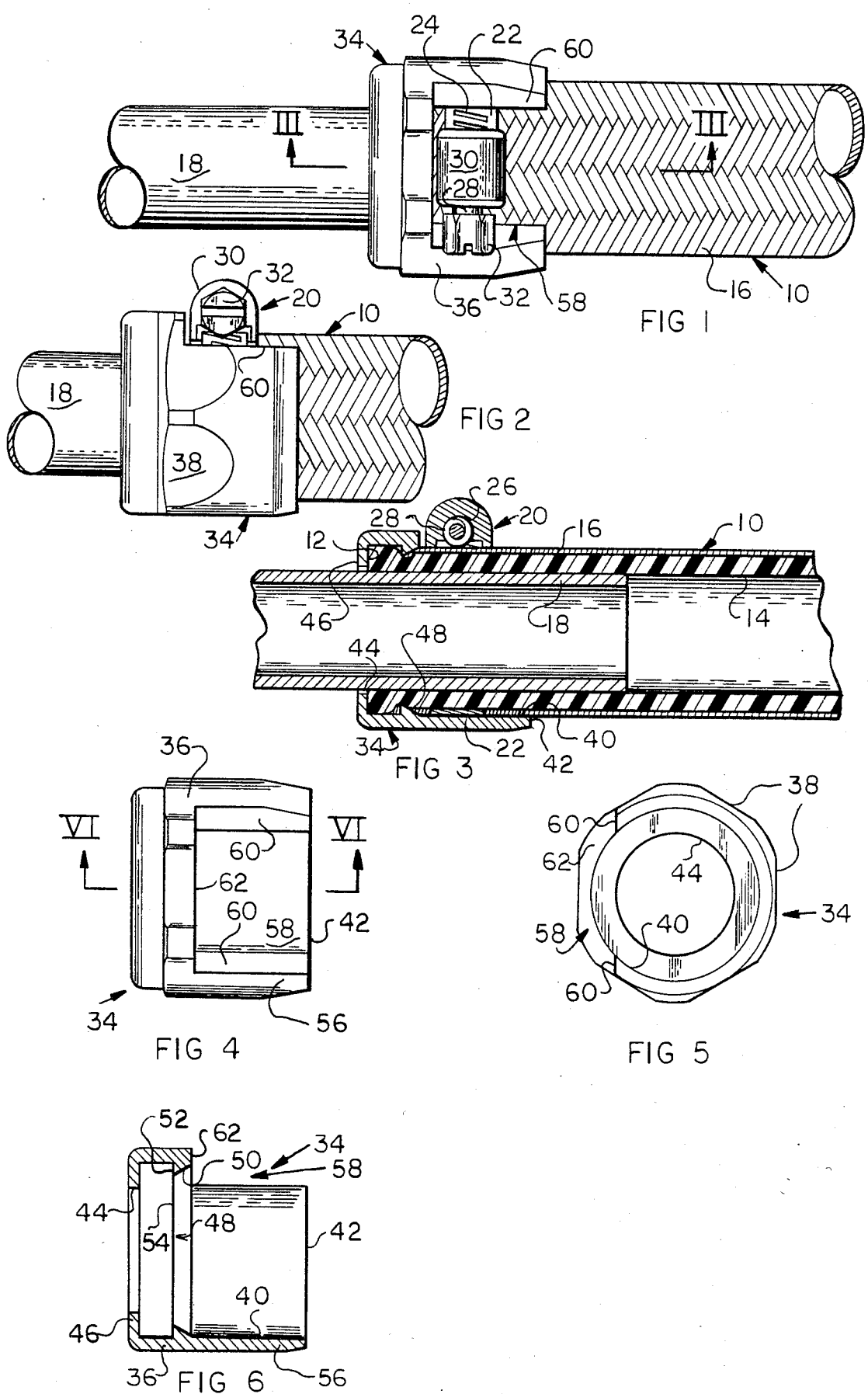

HOSE AND CLAMP CAP

BACKGROUND OF THE INVENTION

The simplest form of hose clamp is the use of an annular band surrounding the hose which is circumferentially contracted to compress the hose upon an internal nipple, tube or similar conduit. Such clamps are usually slightly axially spaced from the hose end, and the compression of the hose adjacent its end by the clamp often distorts the end of the hose producing an unsightly appearance.

A popular circumferentially contracting hose clamp is the worm gear type wherein a screw is rotated having worm teeth defined thereon which engage obliquely oriented slots within the band such that rotation of the screw contracts or expands the band depending on the direction of screw rotation. It has been proposed to utilize a socket fitting with this type of hose clamp to protect the end of the hose and improve the appearance of the fitting. Such a device is shown in U.S. Pat. No. 4,135,744 and U.S. Pat. Nos. Des. 251,676 and 251,918. With hose fittings of the aforementioned type, a window or opening is defined in the wall of the socket through which the clamp screw radially projects, and a recess is internally formed within the socket to accommodate the clamp band. Such apparatus requires that the clamp be initially located within the socket and then the hose is inserted into the assembled socket and clamp, and care must be taken that the clamp band remains in the socket recess during assembly with the hose.

It is an object of the invention to provide a protective and decorative cap for use with the ends of flexible hose wherein the clamp and cap may be easily assembled to the hose, and wherein it is possible to insert the hose end into the socket prior to locating the clamp within the socket.

A further object of the invention is to provide a protective and decorative cap for use with circumferential hose clamps and for use with hose having a frayable outer covering wherein the cap retains the covering adjacent the hose end preventing unraveling and locks upon the hose.

In the practice of the invention an annular cap in the form of a socket includes an open hose receiving end, and an opposite end having a concentric opening into which an adapter or other conduit may be inserted. The skirt of the socket includes a notch having axially extending edges which intersect the hose receiving socket end and is of sufficient circumferential dimension to accommodate the shaft mechanism of a worm drvie hose clamp.

Internally, the socket includes an abutment adjacent the conduit receiving end against which the hose engages upon being inserted into the socket, and an annular shoulder axially spaced from the abutment includes an oblique surface and sharpened edge which compresses the hose cover adjacent its end to confine the hose cover against fraying and also produces a "grip" upon the hose preventing the socket from being removed from the hose end.

As the slot defined in the socket skirt intersects the hose receiving end, it is possible to assemble the clamp and socket to a hose by first inserting the clamp loosely upon the hose, placing the cap on the end of the hose, and then axially moving the clamp along the hose into the socket to locate the clamp as desired prior to tightening.

The cap of the invention produces an attractive cover for the end of hose, shields the hose clamp from view except for the worm gear drive mechanism, and effectively prevents fraying of the hose cover resulting in an attractive and utilitarian assembly.

BRIEF DESCRIPTION OF THE DRAWINGS

The aforementioned objects and advantages of the invention will be appreciated from the following description and accompanying drawings wherein:

FIG. 1 is a top plan view of a hose cap in accord with the invention as assembled to a hose having a braided cover, FIG. 2 is a side elevational view of FIG. 1, FIG. 3 is a detail, diametrical sectional view as taken along Section III—III of FIG. 1, FIG. 4 is a top plan view of the cap, per se, FIG. 5 is an end view of the cap as taken from the right of FIG. 4, and FIG. 6 is a diametrical, elevational, sectional view taken through the cap along Section VI—VI of FIG. 4.

DESCRIPTION OF THE PREFERRED EMBODIMENT

With reference to FIGS. 1–3, an elastomeric hose is represented at 10 having a cut squared end 12, an internal bore 14, and an external protective cover 16. The cover 16 is usually braided, and may be either of fabric or fine wire. Such hose is commonly used in many applications.

A conduit 18 is shown inserted into the end of the hose 10 within the hose bore, and in the illustration the conduit is simply a smooth wall tube. The conduit 18 may constitute an adapter, or a variety of fittings commonly inserted within a hose end.

Sealing of the hose 10 upon the conduit 18 is achieved by clamp 20 which is preferably of the conventional worm gear drive type consisting of a strap or band 22 encircling the hose having a plurality of obliquely formed teeth or slots 24 engageable by the worm teeth 26 defined on the shaft 28 rotatably mounted within housing 30. Rotation of the shaft 28 is through the head 32 as is well known, wherein rotation of the shaft contracts or expands the strap as desired.

The protective and decorative cap of the invention has a construction best appreciated from FIGS. 4–6. The cap 34 comprises a socket 36 of a generally annular configuration having a hexagonal exterior form upon which flats 38 are defined. If desired, the cap may be cylindrical on its outer diameter, or shaped as desired.

The cap includes a cylindrical bore 40 of a diameter only slightly larger than the diameter of the hose cover 16, and the cap includes a hose receiving opening 42 defined by the bore 40. At its opposite end, a smaller diameter opening 44 is defined within the radial flange 46 for receiving the conduit 18, FIG. 3, and the inner surface of the flange forms an abutment for the hose end 12 as later described.

Internally, an annular shoulder or rib 48 is formed within the cap radially extending inwardly of the bore 40, and the shoulder includes the conical oblique surface 50 and the radial surface 52 intersecting at a sharp edge 54, FIG. 6.

The skirt 56 of the socket 36 is provided with an axially extending notch 58 circumferentially defined by axially extending edges 60, and axially defined by the radial surface 62. The edges 60 intersect the cap end opening 42, as apparent in FIGS. 1, 2 and 4, providing access to the notch from the right end of the cap as viewed in the drawing.

In use, the conventional worm drive hose clamp 20 is opened sufficiently to permit the clamp to slide over the end of the hose 10 for several inches. The cap 34 is then inserted upon the hose end, and as the hose end 12 enters the cap opening 42, the cover 16 will be confined by the bore 40. The cap is forced upon the hose end such that the shoulder surface 50 will engage the hose end 12 and compress the cover and hose as the hose passes "under" the edge 54 and the cap continues to be inserted upon the hose end until the cap flange 46 is engaged by the hose end 12.

At this time the conduit 18 may be inserted into the cap opening 44 and into the hose bore 14 the distance desired.

The hose clamp 20 is then axially displaced along the hose 10 toward the cap 34, and may be hand tightened so as to just begin to engage the hose cover. When contracted to such a diameter the clamp may be axially forced into the cap opening 42 upon alignment of the housing 30 with the notch 58, and the clamp is inserted into the cap to the position represented in FIGS. 1-3.

As the housing 30 and shaft head 32 are exteriorly accessible the operator uses a wrench or screwdriver to rotate the shaft 28 and tighten the hose clamp to establish a sealed relationship between the hose and conduit 18.

From the aforegoing description, it will be appreciated that the cap of the invention substantially shields the clamp 20 from view, and fully encompasses the cut end of the hose to produce an attractive and pleasing appearance. Further, the compression of the hose by the annular shoulder 48, and the "bite" produced by the shoulder edge 54 prevents the end of the cover from unbraiding or becoming unraveled, and the cover 16 is effectively retained within the cap preventing loose cover filaments from detracting from the appearance of the assembly.

By utilizing the notch 58 within the skirt of the cap positioning of the hose clamp and cap is readily accomplished, and it is appreciated that various modifications to the inventive concepts may be apparent to those skilled in the art without departing from the spirit and scope of the invention.

We claim:

1. A protective and decorative hose cap adapted to be mounted upon the end of a flexible hose over a hose clamp having a radially extending worm drive and wherein the hose has a cover defining an outer diameter characterized by its ease of assembly to the hose and clamp and ability to confine the hose end wherein the cap comprises an annular body having an inner open hose receiving end and an opposite outer conduit receiving end, the improvement comprising a notch defined within the cap body of sufficient circumferential dimension to receive the clamp worm drive extending therethrough, said notch being defined by spaced axially extending edges intersecting the body inner open hose receiving end and a transversely disposed radial surface intersecting said edges and axially spaced from the body inner open hose receiving end whereby the hose clamp may be axially inserted into the cap while circumscribing the hose, an annular radially inwardly extending flange defined upon the cap body at the outer conduit receiving end, said flange defining an abutment for the hose end upon the cap body being placed upon the hose end, an annular circumferentially continuous radially inwardly extending hose cover retaining shoulder ring defined within the cap body axailly spaced from said flange and having a normal minimum diameter less than the hose outer diameter circumferentially engaging and compressing the hose inserted within the cap body adjacent the hose end, said retaining shoulder ring including a conical surface facing the cap body hose receiving end and converging in the axial direction of the cap body outer conduit receiving end whereby said conical surface aids in compressing the hose upon the hose end being inserted into the cap body and defines a sharp apex engaging the hose outer diameter to resist removal of the hose end from the cap body, the axial spacing of said notch radial surface from the body inner open hose engaging end being less than that of said shoulder ring wherein said notch terminates short of said shoulder ring, the cap body being circumferentially continuous between said flange and said shoulder ring to fully circumferentially enclose the hose end.

* * * * *